US009746043B2

United States Patent
Asen et al.

(10) Patent No.: US 9,746,043 B2
(45) Date of Patent: Aug. 29, 2017

(54) ADJUSTING DEVICE FOR A DISK BRAKE, CORRESPONDING DISK BRAKE AND METHOD FOR OPERATING A WEAR ADJUSTMENT DEVICE FOR A DISK BRAKE

(71) Applicant: KNORR-BREMSE Systeme fuer Nutzfahrzeuge GmbH, Munich (DE)

(72) Inventors: Alexander Asen, Eichendorf (DE); Christian Brandl, Plattling (DE); Matthias Klingner, Moorenweis (DE); Michael Peschel, Schoengeising (DE); Christian Stoeger, Vilshofen (DE); Abdelaziz Rguichi, Olching (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/659,294

(22) Filed: Mar. 16, 2015

(65) Prior Publication Data

US 2015/0192181 A1 Jul. 9, 2015

Related U.S. Application Data

(63) Continuation of application No. PCT/EP2013/069122, filed on Sep. 16, 2013.

(30) Foreign Application Priority Data

Sep. 17, 2012 (DE) .......................... 10 2012 108 672

(51) Int. Cl.
*F16D 65/16* (2006.01)
*F16D 65/54* (2006.01)
(Continued)

(52) U.S. Cl.
CPC ......... *F16D 65/543* (2013.01); *F16D 55/225* (2013.01); *F16D 55/2255* (2013.01);
(Continued)

(58) Field of Classification Search
CPC ........ F16C 19/502; F16D 65/18; F16D 65/54; F16D 65/56; F16D 65/543; F16D 65/567; F16D 55/225
See application file for complete search history.

(56) References Cited

U.S. PATENT DOCUMENTS 5,819,884 A * 10/1998 Giering ................. F16C 19/502
188/71.9
7,926,626 B2 * 4/2011 Iraschko ............... F16D 65/567
188/196 F
(Continued)

FOREIGN PATENT DOCUMENTS

CN 100455839 C 1/2009
CN 102112771 A 6/2011
(Continued)

OTHER PUBLICATIONS

PCT/EP2013/069122, International Preliminary Report on Patentability (PCT/IB/373) dated Mar. 17, 2015, enclosing English Translation of Written Opinion of the International Searching Authority (PCT/ISA/237) (Eleven (11) pages).
(Continued)

*Primary Examiner* — Christopher Schwartz
(74) *Attorney, Agent, or Firm* — Crowell & Moring LLP

(57) ABSTRACT

An adjusting device is disclosed for adjusting friction surface wear on brake linings and a brake disk of a disk brake. The adjusting device is couplable to a brake application device on the drive side, and to a spindle unit of the disk brake on the output side. The adjusting device includes a drive element on both sides of which a rolling element assembly is axially arranged; a pressure element; an output element coupled to the pressure element for coupling to a coupling wheel; an energy storage element; and a support body, one end of which is connected to a bearing plate and around which the drive element, the rolling element assem-
(Continued)

blies, the output element and the energy storage element are arranged axially in series with the bearing plate. The energy storage element is arranged between a bearing portion of the support body and the pressure element.

29 Claims, 9 Drawing Sheets

(51) Int. Cl.
*F16D 55/2255* (2006.01)
*F16D 65/56* (2006.01)
*F16D 55/225* (2006.01)
*F16D 66/00* (2006.01)

(52) U.S. Cl.
CPC ...... *F16D 65/568* (2013.01); *F16D 2066/001* (2013.01); *F16D 2066/005* (2013.01); *F16D 2066/006* (2013.01)

(56) References Cited

U.S. PATENT DOCUMENTS

| 2005/0029858 A1* | 2/2005 | Forster ............... B60T 13/741 303/20 |
| 2005/0035653 A1* | 2/2005 | Godlewsky ............ F16D 65/18 303/122.03 |
| 2006/0266598 A1 | 11/2006 | Baumgartner et al. |
| 2011/0147138 A1 | 6/2011 | Jungmann et al. |
| 2011/0203886 A1* | 8/2011 | Iraschko ............... F16D 65/567 188/71.8 |
| 2012/0168264 A1* | 7/2012 | Putz ..................... F16D 65/18 188/71.8 |

FOREIGN PATENT DOCUMENTS

| DE | 197 29 024 C1 | 1/1999 |
| DE | 101 50 047 A1 | 6/2003 |
| DE | 10 2004 037 771 A1 | 3/2006 |
| DE | 10 2006 061 656 A1 | 7/2008 |
| DE | 10 2008 037 775 B3 | 2/2010 |
| DE | 20 2010 003 739 U1 | 8/2010 |
| DE | 10 2009 039 800 A1 | 3/2011 |
| EP | 2 101 077 A1 | 9/2009 |
| EP | 2 151 597 A1 | 2/2010 |
| EP | 2 479 450 A1 | 7/2012 |

OTHER PUBLICATIONS

PCT/EP2013/069122, International Search Report dated Oct. 2, 2014 (Five (5) pages).
German Examination Report dated Aug. 12, 2013 (Nine (9) pages).
Chinese Office Action issued in Chinese counterpart application No. 201380059686.5 dated Jul. 26, 2016, with partial English translation (Eight (8) pages).

* cited by examiner

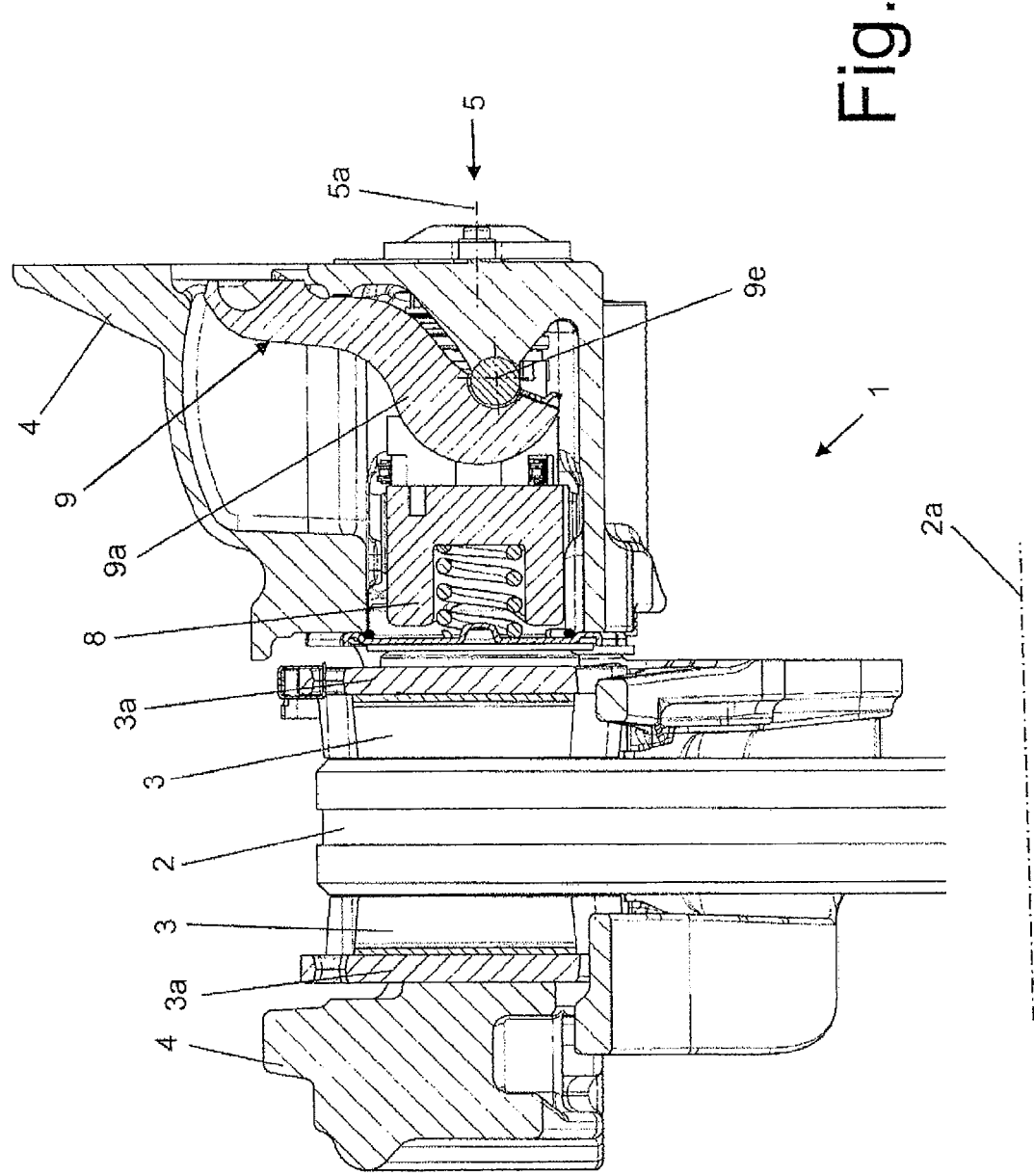

S1 — Estimation of wear of brake linings and brake disk by determined parameters

S2 — Comparison of estimated wear with a reference value and specification of number of brake actuations

S3 — Actuation of disk brake according to specified number to operate wear adjustment device

ADJUSTING DEVICE FOR A DISK BRAKE, CORRESPONDING DISK BRAKE AND METHOD FOR OPERATING A WEAR ADJUSTMENT DEVICE FOR A DISK BRAKE

CROSS REFERENCE TO RELATED APPLICATIONS

This application is a continuation of PCT International Application No. PCT/EP2013/069122, filed Sep. 16, 2013, which claims priority under 35 U.S.C. §119 from German Patent Application No. 10 2012 108 672.9, filed Sep. 17, 2012, the entire disclosures of which are herein expressly incorporated by reference.

BACKGROUND AND SUMMARY OF THE INVENTION

The invention relates to an adjusting device for a disk brake, in particular for a motor vehicle. The invention relates to a corresponding disk brake. The invention furthermore relates to a method for operating a wear adjustment device for a disk brake.

Vehicles and certain technical equipment often use friction brakes to convert kinetic energy. In this context, specifically in the passenger vehicle and commercial vehicle sector, disk brakes are preferred. With the typical design of a disk brake, the brake includes a brake caliper together with an internal mechanism, generally consisting of two brake linings and the brake disk. The cylinder forces are introduced into the internal mechanism via a pneumatically actuated cylinder, intensified by an eccentric mechanism and transmitted to the brake linings and brake disk as an application force via threaded spindles, where the wear of the brake disk and brake linings is compensated by the threaded spindles.

The application forces act on the brake disk via both brake linings. Since, in terms of construction, the linings are designed as wearing parts, they are generally softer than the brake disk, i.e., the linings undergo a change in the thickness of the lining over their time in use: they wear. The brake disk can also wear. This wear gives rise to the need for wear adjustment to compensate the change due to wear, thus establishing a constant release clearance. A constant release clearance is required to keep the response times of the brake short, to ensure the freedom of movement of the brake disk and to maintain a reserve stroke for limiting load cases.

An example of a wear adjustment device is described by document DE 10 2004 037 771 A1. In this case, a driving rotary motion, e.g., that of a torque limiting device, having a ball ramp, for example, is transmitted to an adjusting spindle of a pressure plunger via a continuously acting clutch (slipping clutch). In this case, the release clearance is adjusted continuously.

In the case of mechanical adjusting devices, a speed of adjustment is dependent on the transmission ratio of the adjuster drive. For reasons of installation space, however, a large transmission ratio is not always possible.

There is a continuous need in vehicle engineering to save weight and costs, e.g., during assembly and maintenance, while, at the same time, there should be a saving of energy, i.e., fuel.

It is the object of the present invention to provide an improved adjusting device.

It is a further object to provide an improved disk brake.

Yet another object is to indicate a method for operating a wear adjustment device for a disk brake.

An adjusting device is provided which offers a compact construction radially around a threaded plunger. Virtually all its functional components surround the threaded plunger at least partially. It is easier to replace the adjusting device during maintenance and repair than in the prior art.

An adjusting device according to the invention for friction surface wear adjustment on the brake linings and brake disk of a brake, especially for a motor vehicle, having an application device, preferably a pivoted brake lever, where the adjusting device can be coupled to the application device, preferably the pivoted brake lever, on the drive side, and to a spindle unit of the disk brake on the output side, includes a) a drive element, on each side of which a respective rolling element assembly is axially arranged, one of which is designed as a rolling bearing and the other as a ball ramp clutch with a freewheel; b) a pressure element, which is coupled to the ball ramp clutch and forms an overload clutch together with a portion of the ball ramp clutch; c) an output element, which is coupled to the pressure element, for coupling to a coupling wheel, which is designed for coupling to the spindle unit; d) an energy storage element for generating a preloading force of the ball ramp clutch and of the overload clutch; and e) a support body, one end of which is connected to a bearing plate and around which the drive element, the rolling element assemblies, the overload clutch, the output element and the energy storage element are arranged axially in series with the bearing plate, wherein the energy storage element is arranged between a supporting portion of the support body and the pressure element.

A space-saving, compact and easily replaceable adjusting device is obtained.

A disk brake according to the invention, preferably air-operated, in particular for a motor vehicle, having an application device, preferably a pivoted brake lever, at least one spindle unit, each having a threaded plunger, and at least one wear adjustment device, which is coupled to the application device, preferably the pivoted brake lever, is configured in such a way that the wear adjustment device has the adjusting device explained above.

In one embodiment, the support body is in the form of a sleeve, where the interior of the support body is designed to receive a threaded plunger of a spindle unit of the disk brake to be assigned thereto. The sleeve design results in a saving of weight and materials and furthermore results in the possibility of mounting the adjusting device on the threaded spindle.

The support body has a bearing portion and a receiving portion, which are connected by a shoulder, where the bearing portion has a smaller outside diameter than the receiving portion. This makes it possible to obtain a very largely uniform outside diameter of the adjusting device without major deviations.

In another embodiment, another end of the receiving portion is designed as a supporting portion for the energy storage element. By virtue of the sleeve design, a simple production process for the support body can be designed, and the supporting portion can also be produced in one production cycle.

The output element is also in the form of a sleeve with two cylindrical portions, which can likewise be produced easily by forming without additional machining. Moreover, the two cylindrical portions of the output element have different diameters and are connected by a shoulder portion, where one cylindrical portion, as an output coupling portion, has a larger diameter than the other cylindrical portion, which is designed as an output portion for coupling to the coupling wheel. The energy storage element is arranged between the output coupling portion of the output element and the support body. At the same time, the design of the output element allows coverage and protection from contaminants.

In yet another embodiment, the output portion of the output element extends into an interior space of the coupling wheel and interacts with an internal profile of the coupling wheel via transmission elements, preferably balls. In this way, easy insertion into and removal from the coupling wheel for assembly, maintenance and replacement can be performed quickly. Since, as a further development, the coupling wheel can also simultaneously include the function of a synchronizing wheel of a synchronizing device, no disassembly of the synchronizing device is required for assembly, maintenance and replacement work, and this saves time and costs. Decoupling of the adjusting device from the synchronizing device is thereby achieved.

In another embodiment, the output portion of the output element, the internal profile of the coupling wheel and the transmission elements form a Cardan joint. This results in the advantage that pivoting and vertical movements of a crossmember into which the threaded plungers are screwed can thereby be compensated.

As a yet further development, the coupling wheel is furthermore provided with an engagement portion, which is provided for interaction, for conjoint rotation, with a threaded plunger of a spindle unit of the disk brake to be assigned thereto. The engagement portion can have dogs which interact with axial grooves in the associated threaded plunger, for example. This allows not only simplicity of assembly and disassembly but also relative axial mobility between the coupling wheel and the threaded plunger.

If, in another embodiment, the coupling wheel has a synchronizing portion, which is provided for coupling to a synchronizing means of a synchronizing device of the disk brake to be assigned thereto, there is the resulting advantage of wide functionality of the coupling wheel. The synchronizing portion can be sprocket teeth and the synchronizing means can be a chain, for example.

In another embodiment, the drive element has a contoured portion, which is designed to interact with an actuating contour of an actuator of the application device, preferably of a pivoted brake lever of the disk brake to be assigned thereto. For example, the contoured portion can be teeth, which are formed peripherally, thus making possible easy alignment between the actuator and the drive element.

As a further embodiment, a ramp ring of the ball ramp clutch and the drive element are coupled by an elastic coupling element 14, e.g., a torsion spring. In this way, the ramp balls can be in a particular position or placed in such a position in the ball ramps of the ball ramp clutch. Moreover, a reduction in the backlash of the freewheel can thus be made possible.

In one embodiment of the disk brake according to the invention, the adjusting device of the wear adjustment device is mounted on the threaded plunger of the at least one spindle unit of the disk brake and at least partially surrounds the threaded plunger. When the brake linings are new, the adjusting device surrounds the threaded plunger over at least two thirds of the axial length of the threaded plunger. One advantage here is that a compact construction is made possible.

A disk brake furthermore has at least two spindle units, each having a threaded plunger, where the threaded plungers are screwed into a crossmember, where the crossmember interacts with the application device, preferably the pivoted brake lever, and a synchronizing device. The wear adjustment device furthermore has a driver unit, which is coupled to the threaded spindle of the other spindle unit of the two spindle units of the disk brake.

In one embodiment, the synchronizing device is arranged on the crossmember. The synchronizing device, which is thus situated within the caliper housing, can lead to a shortened construction of the brake caliper. Moreover, no cover is required for the synchronizing device. As a result, covers with a radial sealing concept can be used for both openings in the brake caliper housing which are used for the adjusting device and the driver device, and this simplifies sealing.

Moreover, the elimination of a cover for the synchronizing device opens up more possibilities of variation for the cylinder flange of a pneumatic cylinder.

In yet another embodiment, the synchronizing device has coupling wheels, each of which is coupled for conjoint rotation to the respective threaded plunger of one of the at least two spindle units, and has a synchronizing means, wherein each coupling wheel has a synchronizing portion for interaction with the synchronizing means. In this case, the synchronizing means can be a traction means. For example, the synchronizing means in the form of a traction means can be a chain, wherein the synchronizing portions of the coupling wheels are chain sprocket teeth.

Moreover, provision is made for the coupling wheels of the synchronizing device to be arranged in a fixed location and rotatably on the crossmember. This results in a compact construction.

In another embodiment, the crossmember, together with the threaded plungers and the synchronizing device, is embodied as a preassembled functional unit. In this way, a modularized assembly concept is enabled. Moreover, the crossmember can be exchanged as a pre-synchronized unit together with the threaded plungers during maintenance or servicing without an increased risk as regards incorrect assembly (e.g., unsynchronized threaded plungers).

In yet another embodiment, the threaded plungers of the spindle units are of the same design and construction. It is thereby possible to simplify manufacture.

In another embodiment, the coupling wheel of the spindle unit is coupled to the driver unit by one end of an attachment, which surrounds the associated threaded plunger partially in the manner of a sleeve, where another end of the attachment has an actuating end for manual actuation. A compact construction is thereby achieved.

In yet another embodiment, a reaction-side brake lining is of larger design than an application-side brake lining. By the enlarged surface, the thickness of the friction material of the brake lining can be reduced while keeping the wear volume the same. This results in greater rigidity of the entire disk brake and a reduced capacity of the adjusting device. This reduced capacity furthermore leads to installation space advantages through shorter threaded plungers.

A method for operating a wear adjustment device of a disk brake, in particular the disk brake described above, includes the following. (S1) Determination of parameters, by which it is possible to infer the current wear of brake linings and of an associated brake disk, during a braking operation, and estimation of wear of the brake linings and of the brake disk by the determined parameters during the braking operation; (S2) comparison of the wear estimated in this way with a reference value and specification of a number of brake actuations if the reference value is reached or exceeded; and (S3) actuation of the disk brake in accordance with the specified number of brake actuations in order to operate the wear adjustment device with a high speed of adjustment.

As a result, a setpoint release clearance of the disk brake is reached rapidly since a reduction in release clearance can be achieved in a shorter time. Moreover, energy, e.g., compressed air, required to actuate the brake when the release clearance is too large, to overcome the excessive release clearance, is saved. This energy saving leads to lower fuel consumption.

In another embodiment, an application force is chosen for the disk brake in (S3) in such a way that the response force for the disk brake is just reached. This allows an adjusting operation without the occurrence of a braking effect.

In yet another embodiment, (S3) is carried out as soon as the disk brake is released during the braking operation in which (S1) has been carried out. A speed of adjustment is thereby further increased.

A maximum braking performance is thus obtained, even after high loading of the disk brake.

Short response times of the brake are furthermore made possible.

When braking an axle, there is a reduction in the braking torque deviation.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 5 and 5a are schematic sectional views of the variant of the disk brake according to the invention along the line B-B in FIG. 2 in various states of wear;

FIG. 7 is a schematic flow diagram of one embodiment example of a method according to the invention.

DETAILED DESCRIPTION OF THE DRAWINGS

Figure 1:
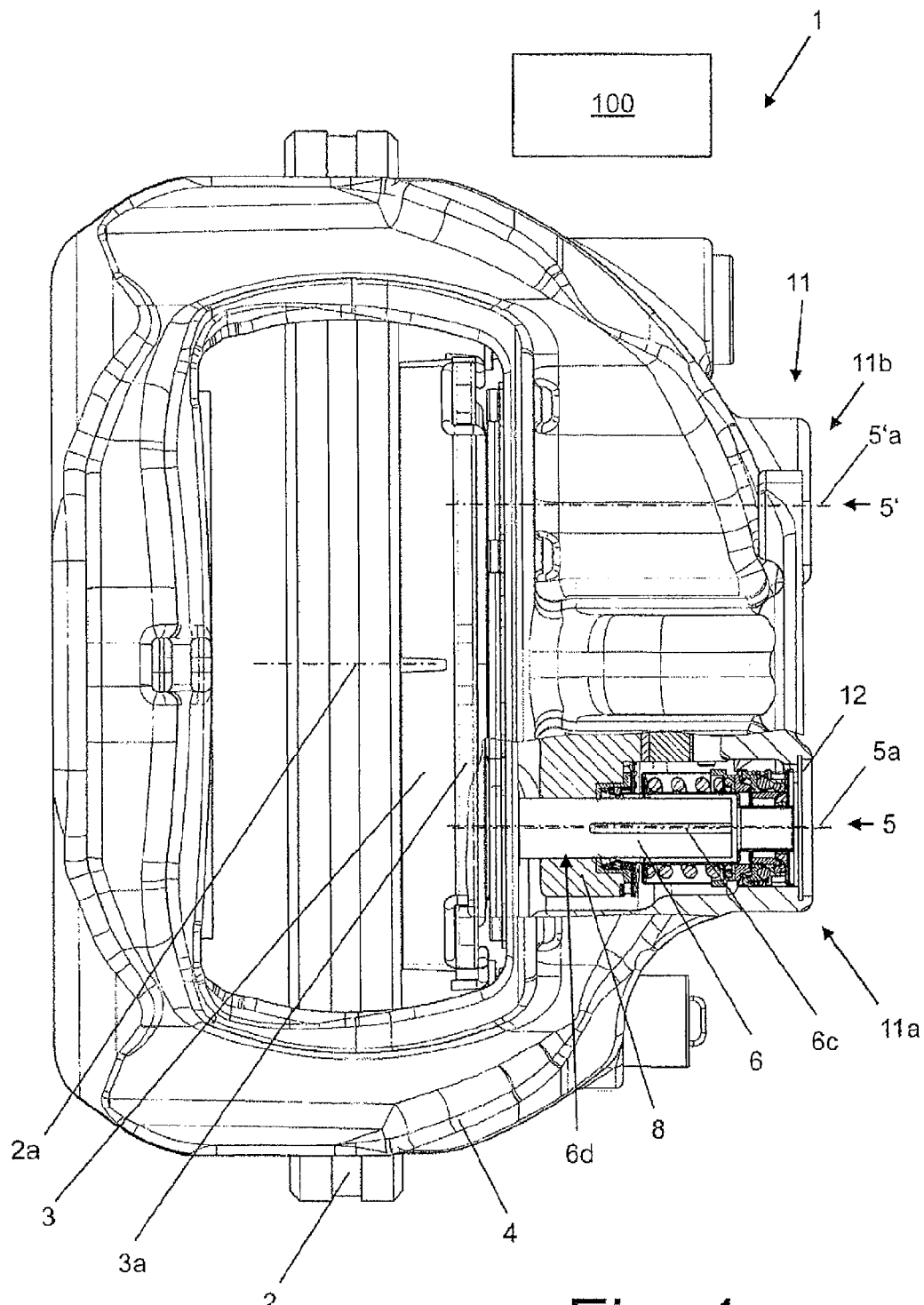
FIG. 1 is a schematic plan view of one embodiment example of a brake according to the invention having an embodiment example of a wear adjustment device according to the invention.
Figure 2:
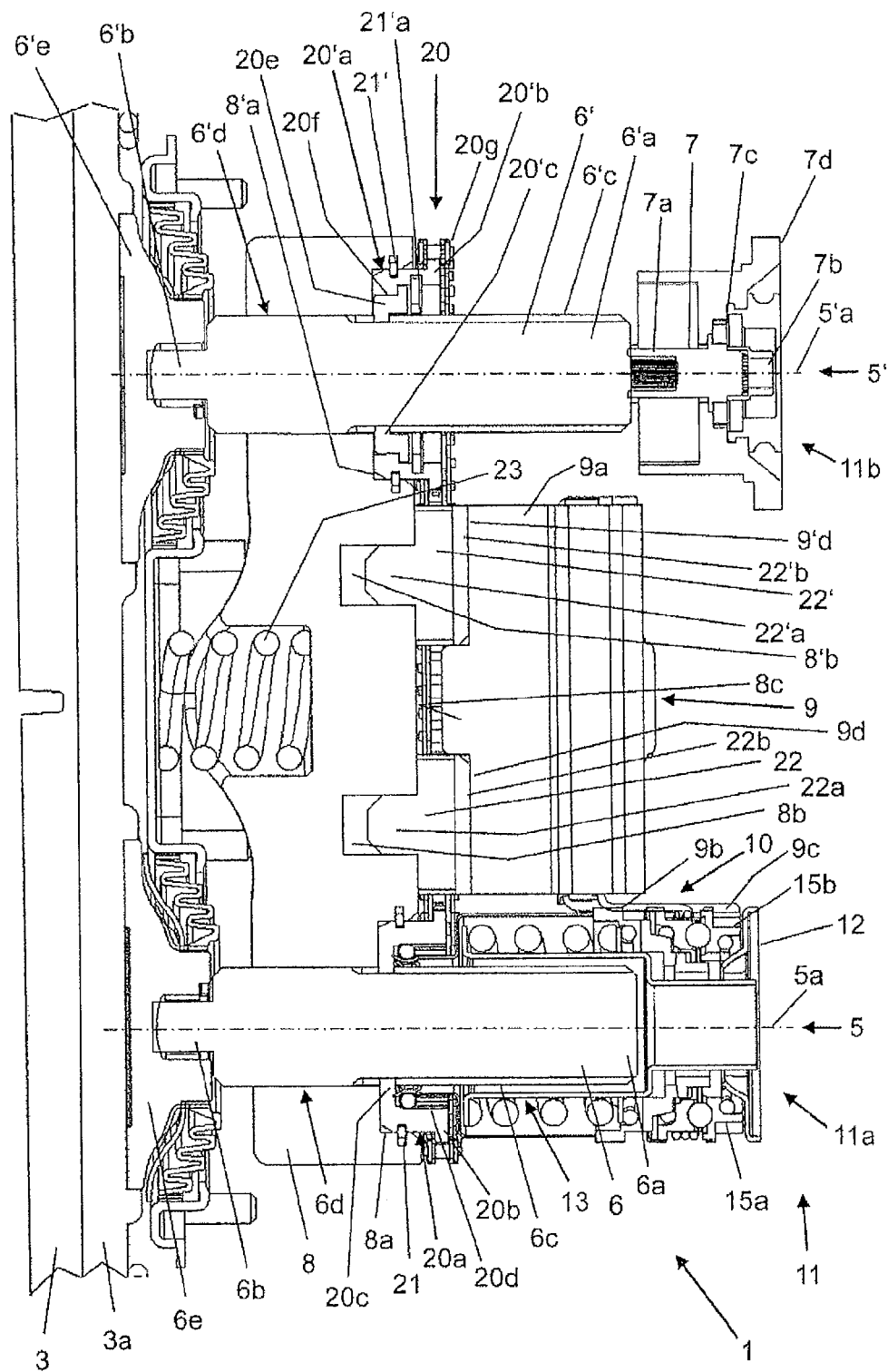
FIG. 2 is a schematic partially sectioned view of the disk brake according to the invention in FIG. 1.

FIG. 1 shows one embodiment example of a disk brake 1 according to the invention in a plan view comprising an embodiment example of a wear adjustment device 11 according to the invention. A schematic partially sectioned view of the disk brake 1 according to the invention in FIG. 1 is illustrated in FIG. 2.

The disk brake 1 has a brake disk 2 having a brake disk axis 2a. The brake disk 2 is overlapped by a brake caliper 4, which is here embodied as a floating caliper. Arranged on both sides of the brake disk 2 is a brake lining 3 in each case having a brake lining carrier 3a, where only the application-side brake lining 3 with the brake lining carrier 3a thereof is shown here. The reaction-side brake lining is not shown here but is easy to imagine and is furthermore shown subsequently in FIGS. 4, 4a, 5 and 5a. In this embodiment example, the disk brake 1 is designed as a two-plunger brake having two spindle units 5, 5'. Each spindle unit 5, 5' has a threaded plunger 6, 6', which is designed as a solid shaft.

The disk brake 1 is furthermore assigned a control unit 100, which is explained in greater detail below.

The application-side brake lining carrier 3a is connected to the spindle units 5, 5' by pressure pieces 6e, 6'e, which are arranged at ends of the threaded plungers 6, 6'. The other reaction-side brake lining carrier 3a is fixed in the brake caliper 4 on the other side of the brake disk, this being evident from FIGS. 4, 4a, 5 and 5a, for example. The threaded plungers 6, 6' are each arranged in such a way that they can be rotated in threads 6d, 6'd in a crossmember 8, which is also referred to as a bridge.

The threaded plungers 6, 6' each have an application-side end 6a, 6'a and a lining-end 6b, 6'b, which is connected to the pressure piece 6e, 6'e and, in this case, is in the form of a pin. The threaded plungers 6, 6' are furthermore each provided with a number of axial grooves 6c, 6'c, which, in this embodiment example, each extend from the application-side end 6a, 6'a in the direction of the respective lining-end 6b, 6'b on the respective circumference of the threaded plunger 6, 6', over approximately two thirds of the length of the respective threaded plunger 6, 6' in the longitudinal direction thereof. Almost the entire length of the threaded plunger 6, 6' apart from the pin-type shaft ends 6b, 6'b is provided with a thread 6d, 6'd, i.e., an external thread. The threaded plungers 6, 6' are screwed into corresponding threaded holes in the crossmember 8 by their threads 6d, 6'd.

The thread 6d, 6'd as an external thread on the threaded plunger 6, 6' and as a corresponding internal thread in the crossmember 8 is here embodied with a pitch in the self-locking range. Rotary movement of the threaded plungers 6, 6' in the crossmember 8 leads to a change in the axial position of the threaded plungers 6, 6' relative to the crossmember 8. Here, the term axial position is intended to mean a position of the threaded plungers 6, 6' in the axial direction of the brake disk axis 2a and of the axes 5a, 5'a.

The crossmember 8 and thus the threaded plungers 6, 6' can be actuated by an application device, in this case a pivoted brake lever 9 having a pivoting axis 9e (see FIGS. 5 and 5a) at right angles to the brake disk axis 2a (see FIGS. 5 and 5a) of the brake disk 2. The pivoted brake lever 9 has a lever body 9a, which, in this case, interacts with the crossmember 8 by two bearing portions 9c, 9'c via respective bearing blocks 22, 22'. In this case, each bearing block 22, 22' is provided with a centering projection 22a, 22'a, which is inserted into respective sockets 8b, 8'b in the crossmember 8. Here, each centering projection 22a, 22'a is of pin-shaped design. In this case, each socket 8b, 8b' is open toward the pivoted brake lever 9 and is of longer length parallel to a longitudinal extent of the crossmember 8 than a centering projection 22a, 22'a of a bearing block 22, 22'. Each bearing block 22, 22' is in operative connection via a pivot bearing 22b, 22'b with the associated bearing portion 9c, 9'c of the pivoted brake lever 9.

The crossmember 8 can be adjusted in the direction of the brake disk axis 2a by the pivoted brake lever 9. A movement toward the brake disk 2 is referred to as an application movement and a movement in the opposite direction is called a release movement. Here, an application side of the crossmember 8 is referred to as a crossmember upper side 8c. A return spring 23 (not explained further) is accommodated in a corresponding recess in the center of the crossmember 8 on the lining side of the crossmember 8 and is supported on the brake caliper 4. By the return spring 23, the crossmember 8 is moved into the released position of the disk brake 1 (shown in FIG. 1) during the release movement.

A distance between the brake linings 3 and the brake disk 2 in the released position is referred to as a release clearance. Owing to lining and disk wear, this release clearance becomes larger. If this is not compensated, the disk brake 1 cannot reach its peak performance since an actuating stroke of the actuating mechanism, that is to say in this case the actuating stroke or a pivoting angle of the pivoted brake lever 9, is increased (see also FIGS. 4*a* and 5*a*).

The disk brake 1 can have different power drives. Here, the pivoted lever 9 is actuated pneumatically, for example. For the construction and operation of a pneumatic disk brake 1, attention is drawn to the corresponding description of DE 197 29 024 C1.

The wear adjustment device 11 according to the invention is designed for the wear adjustment of a previously specified release clearance, which is referred to as the nominal release clearance. The term "adjustment" should be taken to mean a reduction of the release clearance. The previously specified release clearance is determined by the geometry of the brake disk 1 and exhibits a "design release clearance". In other words, the wear adjustment device 11 reduces an existing release clearance if the clearance is too large in relation to the previously specified release clearance.

Here, the wear adjustment device 11 includes an adjusting device 11*a* and a driver device 11*b*. The adjusting device 11*a* is arranged on one spindle unit 5, coaxially with the latter, with the threaded plunger 6 thereof and with an adjuster axis 5*a*. The components and functional groups of the adjusting device 11*a*, which are explained in detail below, are arranged on a support body 13, around the latter, in an axial direction and are thus arranged in the direction of the adjuster axis 5*a*. In this case, the adjusting device 11*a* covers the application-side end 6*a* of the associated threaded plunger 6 and extends to the lining-side end 6*b* of the associated threaded plunger 6, over approximately nine tenths of the entire length of the axial grooves 6*c* of the associated threaded plunger 6 and, in this region, is arranged around threaded plunger 6. In other words, the adjusting device 11*a* is arranged concentrically with the associated threaded plunger 6 and encloses the latter at least partially. Moreover, a further part of the adjusting device 11*a* is arranged as an extension of the application-side end 6*a* of the associated threaded plunger 6 as far as a bearing plate 12. This latter region accounts for approximately one third of the total length in the direction of the adjuster axis 5*a* of the adjusting device 11*a*. By the bearing plate 12, which is not described specifically, the adjusting device 11*a* is supported or inserted in the brake caliper 4.

The adjusting device 11*a* is further described in detail below in conjunction with FIG. 6.

The driver device 11*b* is arranged coaxially with the other spindle unit 5', with the threaded plunger 6' thereof and with a driver axis 5'*a*. In contrast to the threaded plunger 6 of the adjusting device 11*a*, the application-side end 6'*a* of the threaded plunger 6' of the driver device 11*b* is formed in this embodiment example with a profiled projection on which an attachment 7 is mounted for conjoint rotation by an attachment portion 7*a*. The other application-side end of the attachment 7 is designed as an actuating end 7*b* with a further profile for the application of a tool for adjusting the wear adjustment device 11 during maintenance work. Arranged around the attachment 7 is an insert (not explained specifically) in the form of an installation housing 7*d* for insertion and fastening in the brake caliper 4, and it is appropriately connected to the driver device 11*b* and forms a mounting for the device. Installed within the installation housing 7*d* is a sensor 7*c* (not described specifically), which is coupled for conjoint rotation to threaded plunger 6' by the attachment 7. A pickup element of the sensor can be an angle sensor, for example, e.g., a potentiometer, and detects the angular position of threaded plunger 6' around the driver axis 5'*a*. The evaluation of this angular position makes it possible to infer the state of wear of the brake linings 3 and of the brake disk 2 since threaded plunger 6' is coupled to threaded plunger 6 by a synchronizing device 20 described in greater detail below. Thus, the sensor 7*c* is used to detect an adjustment travel, i.e., the state of wear, and is connected via cables (not shown; in an electrically or optically conductive way) to the control unit 100, which can perform the evaluation.

The adjuster axis 5*a*, the driver axis 5'*a* and the brake disk axis 2*a* are arranged parallel to one another.

The adjusting device 11*a* of the wear adjustment device 11 interacts via a drive 10 with the pivoted lever 9. The drive 10 includes an actuator 9*b*, which is connected to the pivoted brake lever 9, and a drive element 15*a* of the adjusting device 11*a*. The actuator 9*b* is provided at its application-side end with an actuating contour 9*c*, which is tooth-shaped, for example, and is in engagement with a contoured portion 15*b* of the drive element 15*a* of the adjusting device 11*a*. The contoured portion 15*b* of the drive element 15*a* corresponds to the actuating contour 9*c* of the actuator 9*b*.

In the unactuated position, i.e., in the released position, there is a clearance provided between the actuating contour 9*c* of the actuator 9*b* and the contoured portion 15*b* of the drive element 15*a* of the adjusting device 11*a*. Taking into account the transmission ratios at the pivoted brake lever 9, this clearance represents the design release clearance of the disk brake 1. In other words, an actuation of the adjusting device 11*a* takes place only after the crossmember 8 has been moved toward the brake disk 2 by a larger travel than the design release clearance during an application of the disk brake 1, i.e., during brake actuation.

The adjusting device 11*a* and the driver device 11*b* are coupled in such a way by the synchronizing device 20 that a rotary motion of threaded plunger 6 about the adjuster axis 5*a* brings about a corresponding rotary motion of threaded plunger 6' about the driver axis 5'*a* and vice versa. Here, the synchronizing device 20 is arranged on the crossmember upper side 8*c* of the crossmember 8 between the crossmember 8 and the pivoted brake lever 9 and includes a coupling wheel 20*a*, which is coupled to the threaded plunger 6 of one spindle unit 5 and to the adjusting device 11*a*, a further coupling wheel 20'*a*, which is coupled to the threaded plunger 6' of the other spindle unit 5' and to the driver device 11*b*, and a synchronizing means 20*g*, to which the coupling wheels 20*a* and 20'*a* are coupled. The synchronizing means 20*g* can comprise a rolling contact mechanism having gearwheels, for example. Other embodiments are, of course, also possible. In this embodiment example, the synchronizing means 20*g* is a traction means, preferably a chain. Thus, the coupling wheels 20*a*, 20'*a* are designed as chain wheels. In this way, synchronous movement of the threaded plungers 6, 6' of the spindle units 5 and 5' during wear adjustment operations (driving by the adjusting device 11*a*) and adjustments during maintenance work, e.g., changing of the linings, (manual drive by the actuating end 7*b* of the driver device 11*b*) is ensured.

Each coupling wheel 20*a*, 20'*a* is mounted rotatably in a fixed location in a socket 8*a*, 8'*a* in the crossmember 8 corresponding to the respectively associated coupling wheel 20*a*, 20'*a*. Here, the openings of the sockets 8*a*, 8'*a* face the application side of the disk brake 1, i.e., they are formed in the crossmember 8 from the crossmember upper side 8c.

Each coupling wheel 20a, 20'a has a body, which is of hollow-cylindrical design on the application side. A synchronizing portion 20b, 20'b is formed in each case on the application-side end circumference, the portion being designed as teeth for a chain as a synchronizing means 20f in this embodiment example. The synchronizing means 20f, the chain, is wrapped around the synchronizing portion 20b, 20'b (here the toothed rim of the chain wheel) over an angle of approximately 180° and is in engagement therewith.

First of all, coupling wheel 20a, which is assigned to the spindle unit 5 having the adjusting device 11a, is described. On its inner wall, the hollow-cylindrical body of coupling wheel 20a is formed with an axially extending internal profile 20d (see also FIG. 6), which interacts with the lining-side end of the adjusting device 11a, this being described in greater detail below in conjunction with FIG. 6. The lining-side end of the hollow-cylindrical body of coupling wheel 20a is provided with an internal engagement portion 20c, which here has dogs that correspond to the axial grooves 6c of the associated threaded plunger 6 and are in engagement therewith. Here, about two thirds of the hollow-cylindrical body of coupling wheel 20a is accommodated in the associated recess 8a in the crossmember 8, where the outside diameter of the hollow-cylindrical body of coupling wheel 20a corresponds to the inside diameter of the recess 8a in the crossmember 8. Here, axial fixing of the hollow-cylindrical body of coupling wheel 20a and thus of coupling wheel 20a itself in the recess 8a in the crossmember 8 is accomplished by a retaining element 21, e.g., a snap ring. The retaining element 21 is fixed in a radial groove in the recess 8a.

Coupling wheel 20'a, which is coupled to the threaded plunger 6' of the other spindle unit 5' having the driver device 11b, has a similar hollow-cylindrical body to coupling wheel 20a. In contrast to coupling wheel 20a, an annular insert element 20e, which is also referred to as a synchronization ring, is inserted into the hollow-cylindrical body of coupling wheel 20'a, and is fixed axially by a retaining element 21' (not described specifically) and radially by a profiling (not shown specifically), e.g., serrations with appropriately fine teeth, in the hollow-cylindrical body of coupling wheel 20'a. By virtue of the radial profile-type fixing of the insert element 20e, it is possible to adjust the synchronizing device 20. When both threaded plungers 6, 6' have been moved into the same axial position relative to the crossmember 8 during the assembly of the disk brake 1, the insert element 20e is inserted as a synchronization ring into coupling wheel 20'a. The insert element 20e has the engagement portion 20'c for engagement in the axial grooves 6'c of the associated threaded plunger 6'.

The engagement portions 20c, 20'c allow coupling of the coupling wheels 20a, 20'a for conjoint rotation to the associated threaded plunger 6, 6' of the spindle units 5, 5'. At the same time, the axial grooves 6c, 6'c ensure that the dogs, in engagement therewith, of the engagement portions 20c, 20'c are guided in an axially movable manner relative to the axial grooves 20c, 20'c in the direction of the adjuster axis 5a or of the driver axis 5'a. In this way, axial movement of the threaded plungers 6, 6' during adjustment relative to the crossmember 8 is not hindered owing to the threads 6d, 6'd.

The synchronizing means 20f, in this case the chain, of the synchronizing device 20 arranged on the crossmember 8 is arranged and guided on the upper side 8c of the crossmember 8, where the synchronizing means is likewise guided on the longitudinal sides of the bearing blocks 22, 22' in the longitudinal direction of the crossmember 8 and is held in the direction of the axis of rotation of the brake disk 2.

Figure 6:
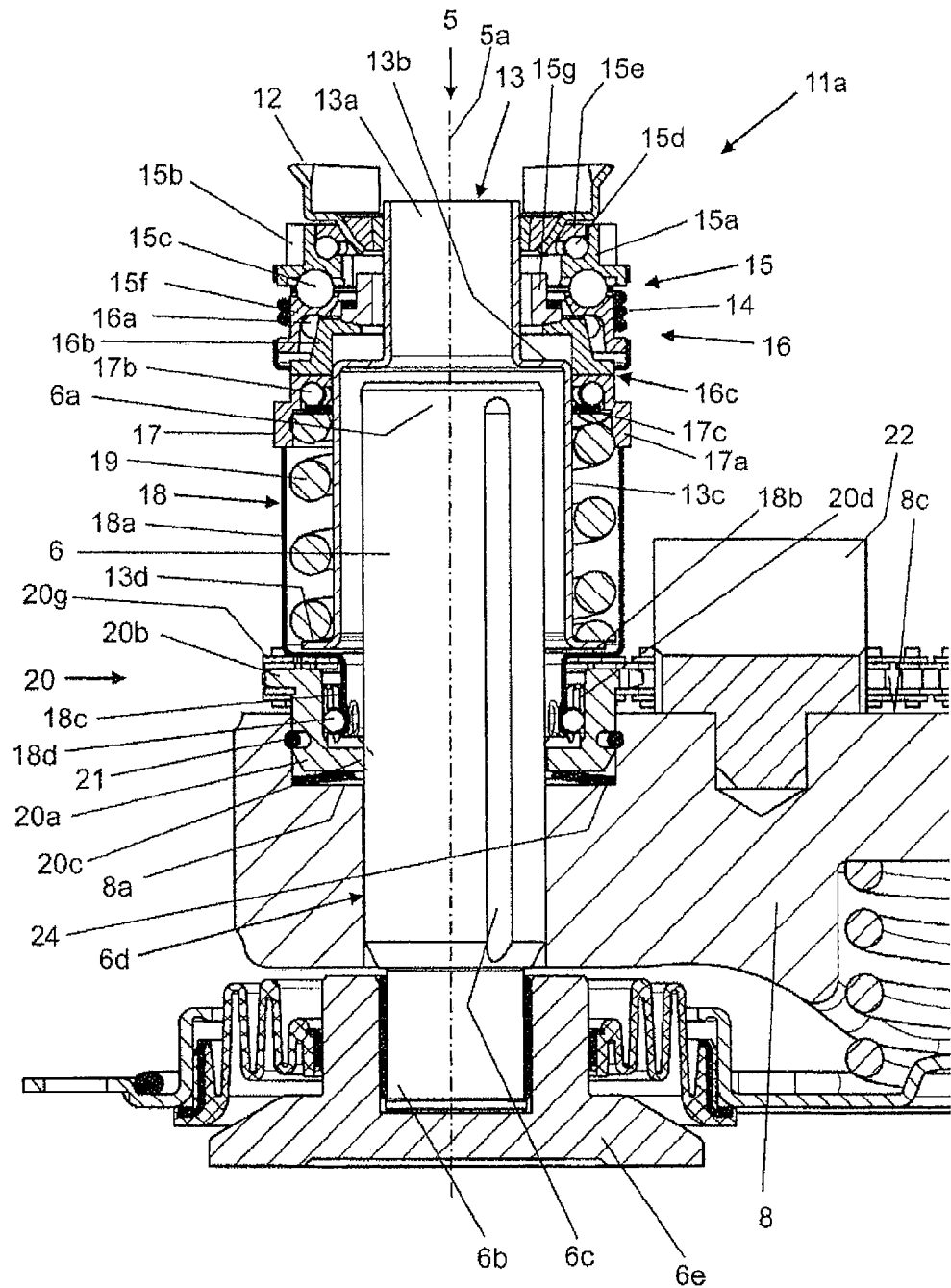
FIG. 6 is an enlarged sectional view of one embodiment example of an adjusting device of the wear adjustment device according to the invention in FIG. 4.

The coupling of coupling wheel 20a to the adjusting device 11a is explained further in conjunction with FIG. 6.

Figure 3:
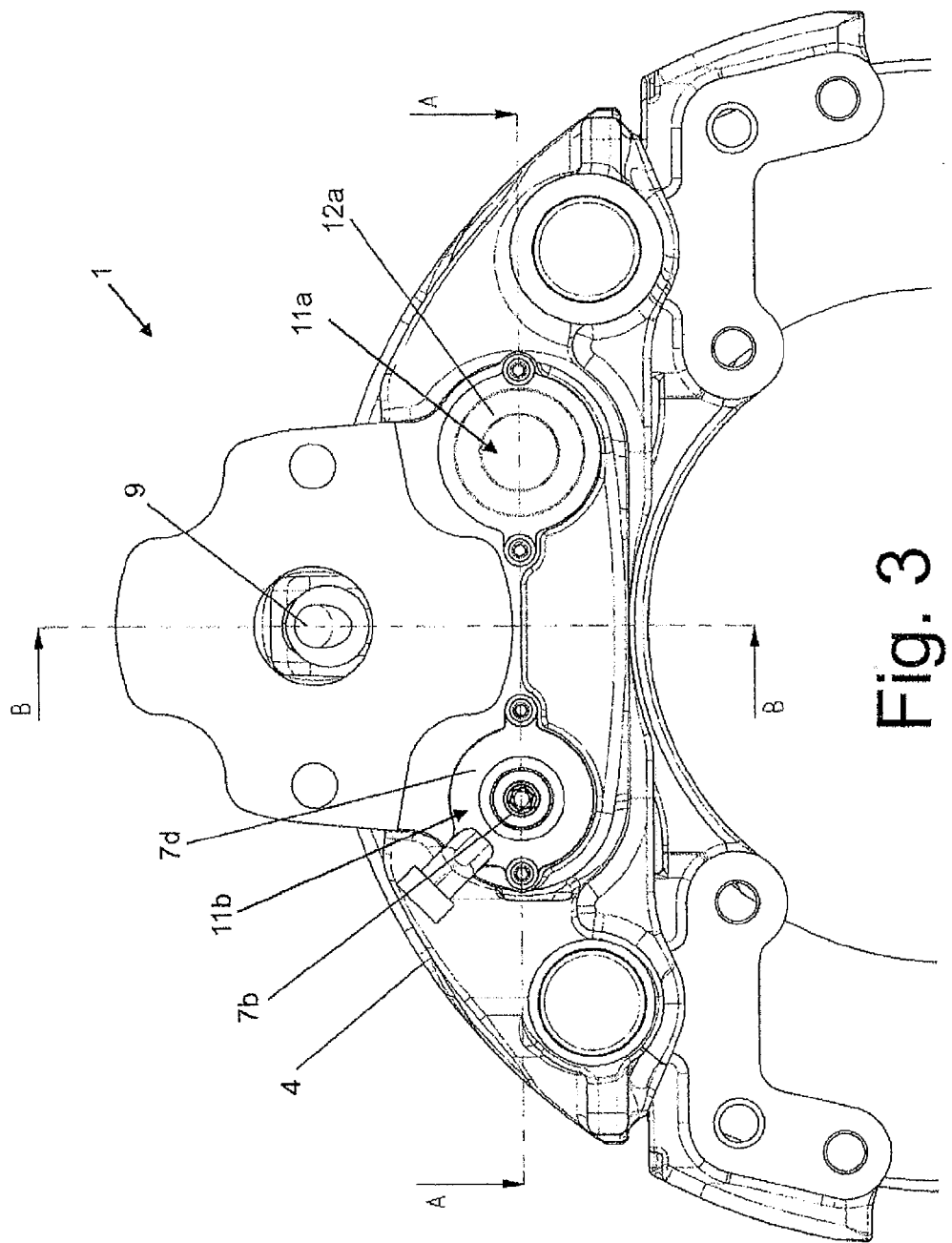
FIG. 3 is a schematic view of one variant of the disk brake according to the invention in FIG. 1 from the application side.
Figure 4:
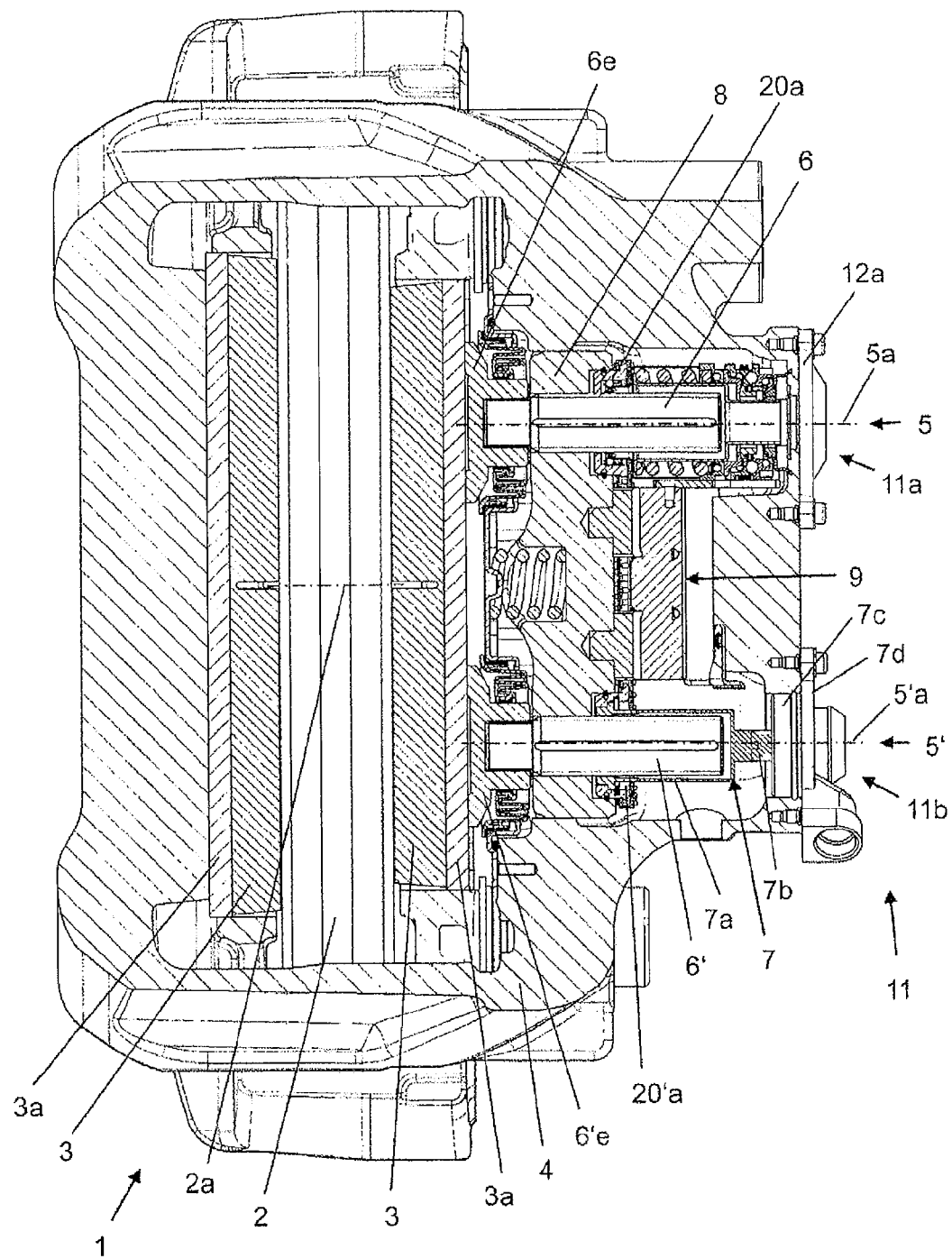
FIGS. 4 and 4a are schematic sectional views of the variant of the disk brake according to the invention along the line A-A in FIG. 2 in various states of wear.
Figure 4A:
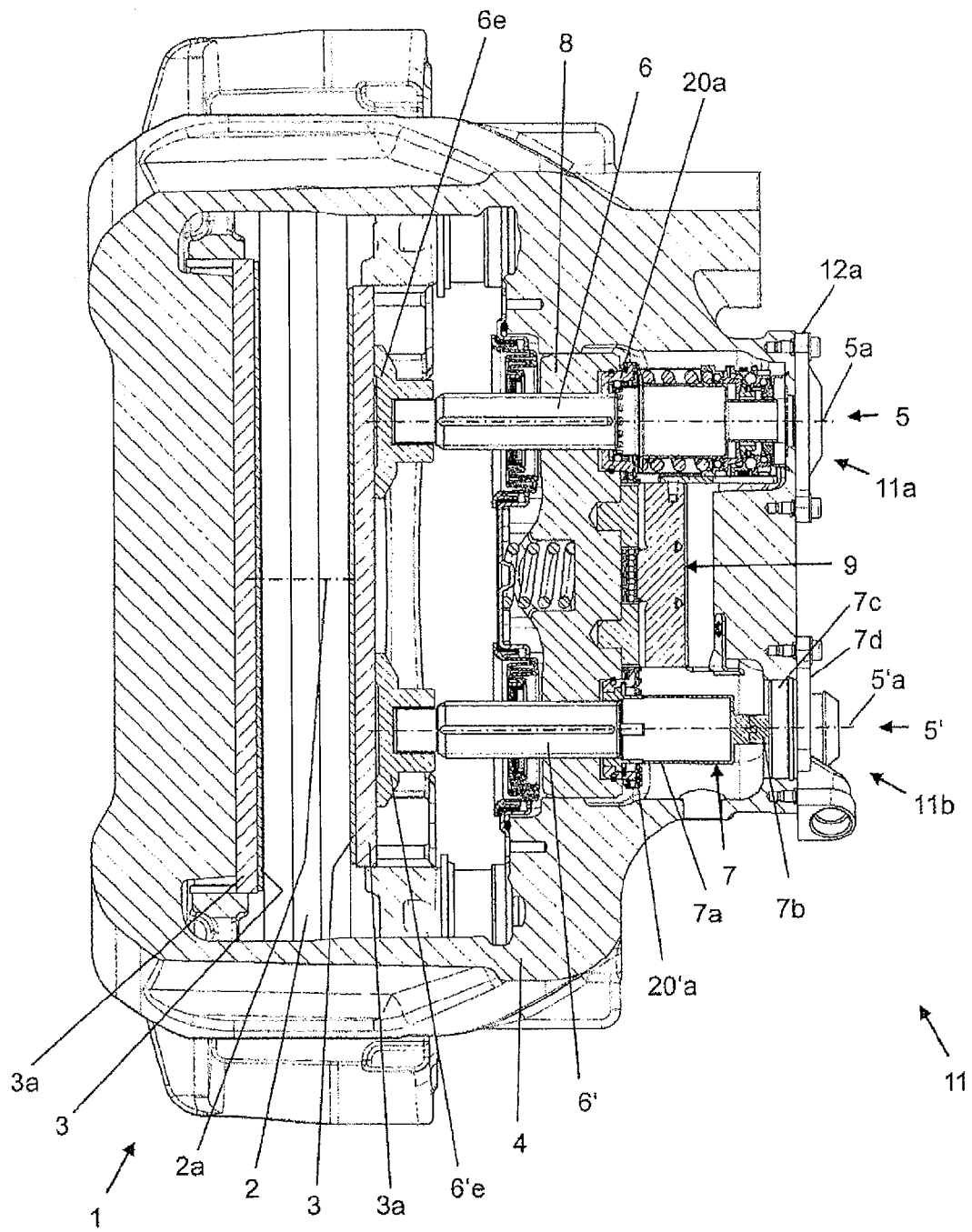
Figure 5A:
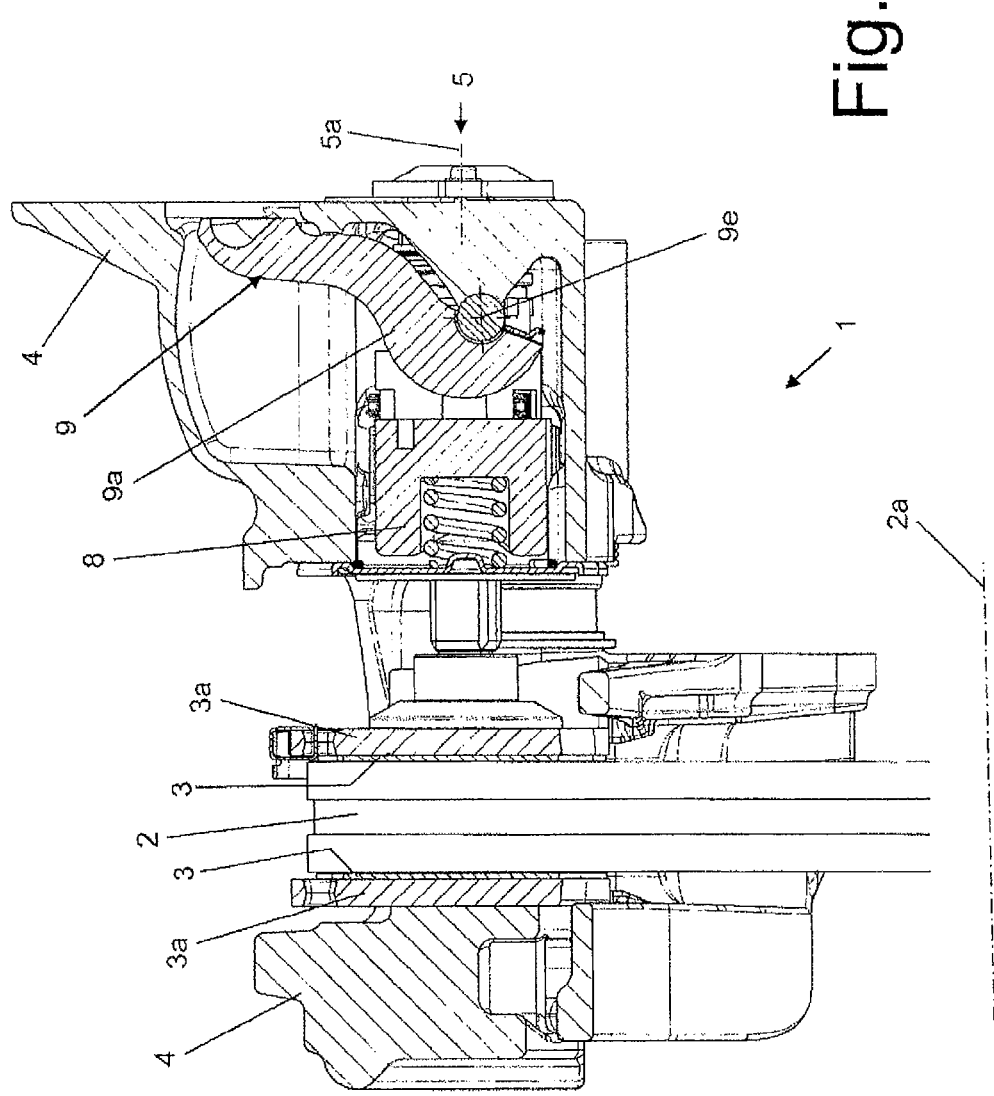

FIG. 3 shows a schematic view of one variant of the disk brake 1 according to the invention in FIG. 1 from the application side. FIGS. 4 and 4a represent schematic sectional views of the variant of the disk brake 1 according to the invention along the line A-A in FIG. 2 in various states of wear of the disk brake 1. FIGS. 5-5a show schematic sectional views of the variant of the disk brake 1 according to the invention along the line B-B in FIG. 2 in various states of wear.

In FIG. 4 and FIG. 5, the disk brake is shown in a state of wear in which the brake linings 3 and the brake disk 2 are new or only slightly worn. In contrast, FIG. 4a and FIG. 5a show a high state of wear of the brake linings 3 and of the brake disk 2. In this case, an adjustment by the wear adjustment device 11 is clearly visible, wherein the threaded plungers 6, 6' have been screwed out of the crossmember 8 on the lining side by more than two thirds of their length.

The application side of the disk brake 1 is shown in FIG. 3, wherein the adjusting device 11a is arranged on the right and the driver device 11b is arranged on the left in the drawing in this variant. A cable entry for the cable of the sensor 7c can be seen on the driver device 11b, the entry not being described specifically. The application force is produced by the pivoted brake lever 9, which is designed as an eccentric lever. A connection flange (not denoted specifically), e.g., for a pneumatic cylinder, which interacts with the longer of two lever arms of the pivoted brake lever 9, can be seen on the illustrated application side of the brake caliper 4. The lever arms are not denoted specifically but are easily imaginable. This is illustrated in FIGS. 5 and 5a. The pivoted brake lever 9 is pivotably mounted in the brake caliper 4 on a pivoting axis 9e by a plain bearing. Force is introduced into the longer lever arm of the pivoted brake lever 9 by a pneumatic cylinder (not shown) for example, the actuating tappet of which engages on the upper end of the pivoted brake lever 9 and introduces a force into the pivoted brake lever 9 parallel to the brake disk axis 2a for the application of the disk brake 1. Force transmission to the crossmember 8 is via the shorter lever arm.

By the crossmember 8, the application force is distributed between the two threaded plungers 6, 6' via the threads 6d, 6'd and transmitted to the application-side brake lining 3 via the pressure pieces 6e, 6'e. After overcoming the design release clearance on the application side, the application-side brake lining 3 (the right-hand brake lining 3 in FIGS. 4, 4a, 5 and 5a) is supported on the brake disk 2, and the brake caliper 4, which is mounted on the brake carrier (not shown specifically) in such a way that it can be moved in the direction of the brake disk axis 2a, is moved until the reaction-side brake lining 3 (the left-hand brake lining 3 in FIGS. 4, 4a, 5 and 5a) also comes to rest on the other side of the brake disk 2.

In this variant, the reaction-side brake lining 3 together with its brake lining carrier 3a is made larger than the application-side brake lining 3. By virtue of its enlarged area, it is possible to reduce the thickness of the friction material of the brake lining 3 for the same volume of wear. At the same time, a higher stiffness of the overall disk brake 1 and a reduced capacity of the wear adjustment is obtained. This reduced capacity leads to installation space advantages owing to shorter threaded plungers and, of course, also to a reduction in weight.

In this variant, the axial grooves 6c, 6'c of the threaded plungers 6, 6' extend over the entire length of the threaded plungers 6, 6', together with the external thread 6d, 6'd.

FIGS. 4 and 4a illustrate that the adjusting device 11a of the wear adjustment device 11 is fastened on the brake caliper 4 with a cover 12a over the bearing plate 12, which is inserted in the brake caliper 4 with the adjusting device 11a.

In contrast to the embodiment shown in FIG. 2, the driver device 11b has a differently configured attachment 7. This makes it possible for the threaded plungers 6 and 6' to be produced in identical embodiments. More specifically, the attachment 7 is in the form of a sleeve, the attachment portion 7a of which is arranged concentrically with threaded plunger 6', around the latter, and is attached to coupling wheel 20'a in a torsionally rigid manner. This sleeve of the attachment 7 has a connection, e.g., a simple-to-assemble torque-proof coupling, to the actuating end 7b, which is passed to the outside (see FIG. 3) and, at the same time, forms a torque-proof coupling to the sensor 7c (see FIG. 2).

FIG. 6 shows an enlarged sectional view of the adjusting device 11a of the wear adjustment device 11 according to the invention in FIG. 4.

The term "at the top" or "upper side" should be taken to mean the side of the respective component which faces the application side in the installed state in the disk brake 1. The "lower side" of the respective component or "at the bottom" then faces the brake disk 2.

The adjusting device 11a includes the bearing plate 12, the support body 13, the drive element 15a, a ball ramp clutch 16 having an overload clutch 16c, which is embodied as a slipping clutch, a pressure element 17, an output element 18 and at least one energy storage element 19.

The bearing plate 12 is described in document DE 10 2004 037 771 A1. This is used to mount and support the adjusting device 11a on the brake caliper 4 in such a way that, on the one hand, it is attached in an upper end region of a bearing portion 13a of the support body 13 and, on the other hand, forms a mounting for the drive element 15a.

The support body 13 is in the form of a sleeve with the upper bearing portion 13a and a receiving portion 13c. The bearing portion 13a has a smaller outside diameter than the receiving portion 13c and is connected to the latter by a shoulder 13b. An axial length of the bearing portion 13a of the support body 13 accounts for approximately one third of the total length of the support body 13, where a total length of the adjusting device 11a is approximately equal to the total length of the support body 13 plus approximately one quarter of the total length of the support body 13. An inside diameter of the receiving portion 13c is embodied with a size such that the receiving portion 13c of the support body 13 at least partially surrounds the associated threaded plunger 6. A lower end of the receiving portion 13c has a collar-shaped bead, which extends radially outward and serves as a supporting portion 13d for the energy storage element 19.

The drive element 15a is part of a ball ramp clutch 15 having a freewheel 16 and has a rolling element assembly on both sides in the axial direction. For this purpose, the drive element 15a is designed on the upper side with an internal encircling rolling element race for supporting balls 15d, which form an upper rolling element assembly with a supporting disk 15e supported on the bearing plate 12. The contoured portion 15b is formed on the encircling outer side of the drive element 15a. The contoured portion 15b can be teeth, for example, which correspond to the actuating contour 9c of the actuator 9b of the pivoted brake lever 9. The contoured portion 15b extends radially with respect to the adjuster axis 5a and is arranged with the drive element 15a on the upper end of the adjusting device 11a, thereby making possible a long lever arm for the actuator 9b in relation thereto (see FIG. 2, for example).

The rolling element assembly underneath the drive element 15a is formed by ramp balls 15c and a ramp ring 15f of the ball ramp clutch 15. Both the lower side of the drive element 15a and the upper side of the ramp ring 15f, which lies opposite the lower side, are designed with ball ramps (not shown specifically) for the ramp balls 15c, which are arranged between the drive element 15a and the ramp ring 15f. The ramp ring 15f and the drive element 15a are furthermore coupled by an elastic coupling element 14, e.g., a torsion spring. On the one hand, the elastic coupling element 14 acts on the ball ramp clutch 15 in such a way that the ramp balls 15c are in a particular position in the ball ramps or are placed in such a position. On the other hand, the elastic coupling element 14 acts on the freewheel 16 to reduce backlash.

The freewheel 16 includes the ramp ring 15f, freewheel balls 16a and an output ring 16b. The freewheel balls 16a are arranged between the lower side of the ramp ring 15f, which is surrounded circumferentially by an axially downward-extending collar with a conical inner side, and a conical outer side of the output ring 16b in a manner not shown specifically to provide a freewheel function, thereby allowing a relative motion between the ramp ring 15f and the output ring 16b in the "release direction".

The ball ramp clutch 15 with the freewheel 16 thus includes the drive element 15a, ramp balls 15c, the ramp ring 15f, the freewheel balls 16a and the output ring 16b.

A radially outward-extending flange is arranged on the lower end of the output ring 16b. The axially downward-extending collar of the ramp ring 15f overlaps approximately two thirds of the output ring 16b in the axial direction on the outside thereof. The bottom rim of the collar and the outer encircling rim of the flange of the output ring 16b are sealed off from the outside by a sealing collar (not denoted specifically).

The upper side of the output ring 16b extends radially inward underneath the ramp ring 15f and is in contact with a lower side of a flange of a supporting sleeve 15g. Starting from this flange, the supporting sleeve 15g extends axially upward, where the outer wall thereof is arranged between the bearing portion 13a of the support body 13 and the inner sides of the ramp ring 15f and of the drive element 15a. Part of the outer circumference of the flange of the supporting sleeve 15g centers the ramp ring 15f.

The output ring 16b has an inner turned recess, the inside diameter of which corresponds to the outside diameter of the receiving portion 13c of the support body 13 and receives the shoulder 13b of the support body 13.

The bearing plate 12, the drive element 15a with its rolling bearing assemblies (supporting balls 15d and ball ramp clutch 15) on both sides, the coupling element 14 and the freewheel 16 as well as the supporting sleeve 15g are arranged in series around the bearing portion 13a of the support body 13.

A pressure element 17 is arranged under the flange of the output ring 16b. The pressure element 17 has a stepped, hollow-cylindrical form with a rim extending radially inward, the upper side of which is in contact with the lower side of the flange of the output ring 16b and forms an overload clutch 16c. This upper rim of the pressure element 17 is provided with an axial bore, which has an inside diameter that corresponds to the outside diameter of the receiving portion 13c of the support body 13. The pressure element 17 is thus centered on the receiving portion 13c in a manner which allows it to move in an axial direction.

Extending downward in an axial direction from this upper rim of the pressure element 17 is a short piece of cylindrical wall, which then merges at a step into a coupling portion 17a of larger diameter, which extends further down in the axial direction. The axial length of the coupling portion 17a is approximately twice as large as the axial length of the cylinder wall arranged thereabove.

A rolling element race, which is in contact with pressure balls 17b, is provided underneath the upper rim of the pressure element 17. The pressure balls 17b are bounded radially by the short piece of cylindrical wall of the pressure element 17 and, underneath, are in contact with a pressure disk 17c. Arranged between the lower side of the pressure disk 17c and the supporting portion 13d of the support body 13 is the energy storage element 19, which in this case is embodied as a compression spring. The uppermost turn of the energy storage element 19 is accommodated in the pressure element 17 by the encircling coupling portion 17a thereof, under the pressure disk 17c.

The energy storage element 19 produces an axial force between the supporting portion 13d of the support body 13 and the supporting disk 15e, which is connected to the bearing plate 12 and, via the latter, to the upper end of the support body 13. In this way, the functional elements of the adjusting device 11a are pressed together. Moreover, the energy storage element 19 produces a preload on the ball ramp clutch 16 and the overload clutch 16c.

The lower side of the coupling portion 17a of the pressure element 17 is connected to the upper portion of the output element 18. The output element 18 is formed in a manner similar to the support body 13 in the form of a sleeve with two cylindrical portions 18a, 18c, which are connected by a shoulder portion 18b, where the upper cylindrical portion, as an output coupling portion 18a, has a larger diameter than the portion cylindrical at the bottom, which is referred to as output portion 18c. In other words, the output element 18, in contrast to the support body 13, is arranged rotated through 180° about the horizontal and, with its output coupling portion 18a, covers the receiving portion 13c of the support body 13 over more than three quarters of the length of the receiving portion 13c of the support body 13. The axial length of the output coupling portion 18a is approximately three quarters of the length of the receiving portion 13c of the support body 13, and the axial length of the output portion 18c of the output element 18 is about one third of the length of the output coupling portion 18a of the output element 18. In this case, the energy storage element 19 is arranged between the outer side of the receiving portion 13c and the inner side of the output coupling portion 18a. The shoulder portion 18b of the output element 18 lies underneath the supporting portion 13d of the receiving portion 13c of the support body 13.

The output portion 18c of the output element 18 extends into the interior of coupling wheel 20a with a radial clearance with respect to the internal profile 20d of coupling wheel 20a. Formed in the lower end region of the output portion 18c in this embodiment example are sockets (not denoted specifically), in each of which a transmission element 18d—here the transmission elements 18d are designed as balls—is arranged so as to be movable. The transmission elements 18d establish engagement with the output element 18b, on the one hand, and engagement with the internal profile 20d of coupling wheel 20a, on the other hand. In this way, a torque-proof coupling of the output element 18 to coupling wheel 20a is formed. Moreover, this type of coupling forms a Cardan joint, thereby compensating pivoting and vertical movements of the crossmember 8.

Coupling wheel 20a, in turn, is in engagement for conjoint rotation by the engagement portion 20c, which here has a plurality of dogs, of its underside with the axial grooves 6c of the threaded plunger 6, wherein a relative axial movement between coupling wheel 20a and thus between the crossmember 8 and the threaded plunger 6 is made possible. This is also the case between coupling wheel 20'a and threaded plunger 6', as already described above, wherein coupling wheels 20a and 20'a are coupled via the synchronizing portions 20b thereof by the synchronizing means 20g, here a chain.

In other words, the adjusting device 11a is positively coupled, via coupling wheel 20a, to threaded plunger 6 and, via the chain (synchronizing means 20g) of the synchronizing device 20, via the other coupling wheel 20'a to the other threaded plunger 6' of the driver device 11b.

Coupling wheel 20a (and likewise the other coupling wheel 20'a) is arranged in a fixed location and rotatably on the crossmember 8. FIG. 6 shows that coupling wheel 20a is inserted into the socket 8a of the crossmember 8 and fixed axially by the retaining element 21. An axial spring 24, e.g., a diaphragm spring, is furthermore arranged between the lower side with the engagement portion 20c of coupling wheel 20a and the bottom of the socket 8a, thereby providing a defined position of coupling wheel 20a to the synchronizing means 20g.

Thus, it is also possible for the adjusting device 11a to be replaced without removing the synchronizing device 20, since the output portion 18c can be pulled out of and reinserted into coupling wheel 20a in a simple manner.

The operation of the adjusting device 11a is explained below.

During each application movement of the pivoted brake lever 9 (FIGS. 4, 4a, 5 and 5a), the design release clearance is first of all traversed, using the actuator 9b connected to the pivoted brake lever 9, by the actuating contour 9c, which is in engagement with the contoured portion 15b of the drive element 15a of the adjusting device 11a, and then turned about the adjuster axis 5a in a particular direction of rotation, e.g., clockwise, using the drive element 15a.

In the case in which adjustment of the release clearance has become necessary, this rotary motion of the drive element 15a is transmitted by the ball ramp clutch 15 to the ramp ring 15f. In this rotary motion, the freewheel 16 locks and acts as a torque-proof coupling, such that this rotary motion is transmitted onward to the output ring 16b.

The output ring 16b, for its part, transmits this rotary motion via the overload clutch 16c to the pressure element 17, which is connected for conjoint rotation to the output element 18. By the output portion 18c of the output element 18, the rotary motion is transmitted by the transmission elements 18d, which are here designed as balls, to coupling wheel 20a via the internal profile 20d for the purpose of adjustment. Coupling wheel 20a, for its part, is coupled for conjoint rotation to threaded plunger 6 and, via the synchronizing means 20g, by the other coupling wheel 20'a to the threaded plunger 6' of the driver device 11b and thus transmits the rotary motion of the adjusting device 11a to the threaded plungers 6, 6', which are rotated in the threads in the crossmember 8 to adjust the brake lining 3.

As soon as the brake linings 3 lie resting on the brake disk 2 due to the adjusting movement, the threaded plungers 6, 6' are locked in the crossmember 8 by the clamping force which is built up during this process and the resulting frictional force in the threads 6d, 6'd in the crossmember 8.

Although a further feed motion then continues to be transmitted to the drive element 15a via the actuator 9b by the pivoted brake lever 9, further transmission to the output ring 16b by the ball ramp clutch 15 is prevented. During this process, the ball ramp clutch 15 forms an overload clutch.

To ensure that the adjustment thus performed is not canceled out again by a return movement or return pivoting of the pivoted brake lever 9 when the disk brake 1 is released, the freewheel 16 then acts in such a way that, during the release movement, the return movement of the drive element 15a, in the counterclockwise direction in the example used here, initiated by the actuator 9b is not transmitted to the output ring 16b, wherein the drive element 15a performs a relative rotary motion back in the counterclockwise direction relative to the stationary output ring 16b.

In the other case, in which adjustment of the brake linings 3 is (as yet) not required, the threaded plungers 6, 6' are immediately locked by contact of the brake linings 3 on the brake disk 2 after the design release clearance has been traversed, and the overload clutch formed by the ball ramp clutch 15 allows rotation of the drive element 15a relative to the ramp ring 15f.

The overload clutch 16c is necessary particularly in the case of manual resetting of the threaded plungers 6, 6' by the actuating end 7b of the driver device 11b, e.g., in the case of maintenance (see FIGS. 4 and 4a, for example). In this case, threaded plunger 6' is rotated via coupling wheel 20'a by the manually rotated attachment 7. This rotary motion is transmitted via the synchronizing means 20g of the synchronizing device 20 to coupling wheel 20a and the threaded plunger 6 coupled thereto. At the same time, however, the output element 18 of the adjusting device 11a is rotated counter to an adjusting rotary motion (in the counterclockwise direction in the example) owing to the coupling of the transmission elements 18d between the internal profile 20d of coupling wheel 20a and the output portion 18c. Since, however, the drive element 15a, which is in engagement with the stationary actuator 9b, is thus locked, the overload clutch 16c is released and the manual rotary return motion of the threaded plungers 6, 6' is decoupled from the locked drive element 15a.

During a prolonged braking operation, e.g., downhill travel, a relatively large amount of wear can occur on brake linings 3 during just one brake actuation. As a result, the current release clearance of the disk brake 1 can become so large that it cannot be completely reset during a subsequent braking operation. During a brake actuation, a reduction in release clearance of about 20% is usually achieved. If the release clearance present is up to 2 mm and the design release clearance is 0.8 mm, a release clearance of 1.76 mm would remain after the subsequent brake actuation, even though there should be a setpoint release clearance of about 0.8 mm. A larger reduction in the release clearance within a shorter time, i.e., a high speed of adjustment, can be achieved with the method according to the invention, which is now described in conjunction with FIG. 1 and FIG. 7.

To this end, FIG. 7 is a schematic flow diagram of one embodiment example of the method according to the invention for operating the wear adjustment device 11 of the disk brake 1.

In a first method step S1, various parameters, by which it is possible to infer the current wear on the brake linings 3, are determined during application during a braking operation with the disk brake 1. These include, for example, a duration of the braking operation, the force of application (e.g., a pressure of a pneumatic cylinder which actuates the pivoted brake lever 9), the ambient temperature, a current temperature of the disk brake 1 or the rise in temperature thereof, the previously determined or estimated wear value. Other parameters of a brake control device and/or an engine control device, e.g., the speed of travel, the actual total weight of the vehicle etc., can also be used.

By these parameters which are being determined, the wear during this braking operation is then determined using an estimation method, i.e., using an appropriate algorithm. This determination can take place in control unit 100 (see FIG. 1), e.g., by software. It is, of course, also possible for a separate device or a component of a brake control device to be used for this purpose.

The wear estimated in this way corresponds to a currently estimated release clearance of the disk brake. At the end of the braking operation or when an estimated value is available, this estimated value is compared with a predeterminable reference value. This is performed in a second step S2.

If the reference value is not reached, there is no further action.

If the estimated value is greater than or equal to the reference value, a number of slight brake actuations is determined. This can be carried out by stored tabulated values or calculations, for example.

In a third method step S3, the disk brake 1 is then actuated slightly several times in an appropriate manner according to the number determined in order to achieve the adjustment of the wear value. Here, the slight brake actuations are performed in such a way that, for example, a brake pressure is chosen such that the response pressure of the disk brake 1 is just reached. As a result, the adjusting device 11a is actuated by the actuator 9b of the pivoted brake lever 9 and performs an adjustment. In this way, the setpoint release clearance is achieved more quickly.

In this case, the brake control device is controlled in such a way by the control unit 100 by appropriate signals in the third method step S3 that the slight brake actuations can be initiated by the brake control device. This can begin even during the release process of the disk brake 1 after the relevant braking operation.

In this way, a high speed of adjustment, i.e., an increase in the speed of adjustment, can be brought about in the case of the disk brake 1 described above by the method according to the invention for operating the wear adjustment device 11. However, this method can also be used on other brakes with wear adjustment devices.

The wear adjustment device 11 is designed for wear adjustment for pneumatically applied disk brakes in the commercial vehicle sector but can also be used in all other applications where wear compensation is necessary.

The invention is not restricted by the embodiment examples described above. It can be modified within the scope of the attached claims.

Thus, for example, it is conceivable for the corresponding mechanical freewheel device to be used as a bought-in part as coupling element 14 instead of a torsion spring.

The energy storage element 19 can include a plurality of spring elements, and these can also differ.

No cover is required for the synchronizing device 20. As a result, covers with radial seals, e.g., O-rings, can be used for the openings for the adjusting device 11a and the driver device 11b in the brake caliper 4.

The cross member 8, together with the threaded plungers 6, 6' and the synchronizing device 20, can also be embodied as a preassembled and synchronized unit (modularized assembly concept). The cross member 8 can then be replaced as a preassembled unit.

It is also conceivable for the adjusting device 11*a* to be used for a disk brake 1 having just one spindle unit 5 with one threaded plunger 6 or, of course, also more than two threaded plungers 6, 6'. In the case where the disk brake 1 is embodied with just one threaded plunger 6, coupling wheel 20*a* can be embodied without a synchronizing portion 20*b*.

LIST OF REFERENCE SIGNS

1 disk brake
2 brake disk
2*a* brake disk axis
3 brake lining
3*a* brake lining carrier
4 brake caliper
5, 5' spindle unit
5*a* adjuster axis
5'*a* driver axis
6, 6' threaded plunger
6*a*/6'*a*/6*b*/6'*b* shaft end
6*c*, 6'*c* axial groove
6*d*, 6'*d* thread
6*e*, 6'*e* pressure piece
7 attachment
7*a* attachment portion
7*b* actuating end
7*c* sensor
7*d* installation housing
8 crossmember
8*a*/8'*a*/8*b*/8'*b* socket
8*c* crossmember upper side
9 pivoted brake lever
9*a* lever body
9*b* actuator
9*c* actuating contour
9*d*, 9'*d* bearing portion
9*e* pivoting axis
10 drive
11 wear adjustment device
11*a* adjusting device
11*b* driver device
12 bearing plate
12*a* cover
13 support body
13*a* bearing portion
13*b* shoulder
13*c* receiving portion
13*d* supporting portion
14 coupling element
15 ball ramp clutch
15*a* drive element
15*b* contoured portion
15*c* ramp ball
15*d* supporting ball
15*e* supporting disk
15*f* ramp ring
15*g* supporting sleeve
16 freewheel
16*a* freewheel ball
16*b* output ring
16*c* overload clutch
17 pressure element
17*a* coupling portion
17*b* pressure ball
17*c* pressure disk
18 output element
18*a* output coupling portion
18*b* shoulder portion
18*c* output portion
18*d* transmission element
19 energy storage element
20 synchronizing device
20*a*, 20'*a* coupling wheel
20*b*, 20'*b* synchronizing portion
20*c* engagement portion
20*d* internal profile
20*e* insert element
20*f* teeth
20*g* synchronizing means
21, 21', 21'*a* retaining element
22, 22' bearing block
22*a*, 22'*a* centering projection
22*b*, 22'*b* pivot bearing
23 return spring
24 axial spring
100 control unit
S1 . . . 3 method step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjusting device for friction surface wear adjustment on brake linings and a brake disk of a disk brake having an application device, wherein the adjusting device is coupleable to the application device on a drive side and to a spindle unit of the disk brake on an output side, the adjusting device comprising:
    a drive element, wherein on each side of the drive element a respective rolling element assembly is axially arranged, wherein one of the rolling element assemblies is a rolling bearing and one of the rolling element assemblies is a ball ramp clutch with a freewheel;
    a pressure element which is coupled to the ball ramp clutch and which forms an overload clutch together with a portion of the ball ramp clutch;
    an output element which is coupled to the pressure element and coupleable to a coupling wheel which is designed for coupling to the spindle unit;
    an energy storage element, wherein the energy storage element generates a preloading force of the ball ramp clutch and of the overload clutch; and
    a support body, wherein an end of the support body is connected to a bearing plate, wherein around the support body the drive element, the rolling element assemblies, the overload clutch, the output element, and the energy storage element are arranged axially in series with the bearing plate, and wherein the energy storage element is arranged between a supporting portion of the support body and the pressure element.

2. The adjusting device as claimed in claim 1, wherein the support body is in a form of a sleeve and wherein a threaded plunger of a spindle unit of a disk brake coupleable to the adjusting device is receivable in an interior of the support body.

3. The adjusting device as claimed in claim 2, wherein the support body has a bearing portion, a receiving portion, and a shoulder, wherein the bearing portion and the receiving portion are connected by the shoulder, and wherein the bearing portion has a smaller outside diameter than the receiving portion.

4. The adjusting device as claimed in claim 3, wherein an end of the receiving portion is a supporting portion for the energy storage element.

5. The adjusting device as claimed in claim 1, wherein the output element is in a form of a sleeve with two cylindrical portions.

6. The adjusting device as claimed in claim 5, wherein the two cylindrical portions of the output element have different diameters and are connected by a shoulder portion, wherein one of the two cylindrical portions, as an output coupling portion, has a larger diameter than the other of the two cylindrical portions which is an output portion for coupling to the coupling wheel.

7. The adjusting device as claimed in claim 6, wherein the energy storage element is arranged between the output coupling portion of the output element and the support body.

8. The adjusting device as claimed in claim 6, wherein the output portion of the output element is extendable into an interior space of the coupling wheel and interactable with an internal profile of the coupling wheel via transmission elements.

9. The adjusting device as claimed in claim 8, wherein a Cardan joint is formable by the output portion of the output element, the internal profile of the coupling wheel, and the transmission elements.

10. The adjusting device as claimed in claim 1, wherein the coupling wheel has an engagement portion which interacts, for conjoint rotation, with a threaded plunger of a spindle unit of the disk brake to be assigned thereto.

11. The adjusting device as claimed in claim 10, wherein the coupling wheel has a synchronizing portion which is coupled to a synchronizing device of the disk brake to be assigned thereto.

12. The adjusting device as claimed in claim 1, wherein the drive element has a contoured portion which is interactable with an actuating contour of an actuator of the application device to be assigned thereto.

13. The adjusting device as claimed in claim 1, wherein a ramp ring of the ball ramp clutch and the drive element are coupled by an elastic coupling element.

14. A disk brake, comprising:
an application device;
a spindle unit having a threaded plunger; and
a wear adjustment device which is coupled to the application device, wherein the wear adjustment device has an adjusting device as claimed in claim 1.

15. The disk brake as claimed in claim 14, wherein the adjusting device of the wear adjustment device is mounted on the threaded plunger of the spindle unit and at least partially surrounds the threaded plunger.

16. The disk brake as claimed in claim 15, wherein the adjusting device surrounds the threaded plunger over at least two thirds of an axial length of the threaded plunger when brake linings of the disk brake are new.

17. The disk brake as claimed in claim 15, further comprising a second spindle unit having a threaded plunger, wherein the respective threaded plungers are screwed into a crossmember, wherein the crossmember interacts with the application device and a synchronizing device, and wherein the wear adjustment device has a driver unit which is coupled to the threaded spindle of the second spindle unit.

18. The disk brake as claimed in claim 17, wherein the synchronizing device is arranged on the crossmember.

19. The disk brake as claimed in claim 18, wherein the synchronizing device comprises coupling wheels, each of which is coupled for conjoint rotation to a respective threaded plunger of the first and second spindle units, and comprises a synchronizing apparatus, wherein each coupling wheel has a synchronizing portion for interaction with the synchronizing apparatus.

20. The disk brake as claimed in claim 19, wherein the synchronizing apparatus is a traction apparatus.

21. The disk brake as claimed in claim 20, wherein the synchronizing apparatus is a chain and wherein the synchronizing portions of the coupling wheels are chain sprocket teeth.

22. The disk brake as claimed in claim 21, wherein the coupling wheels of the synchronizing device are arranged in a fixed location and rotatably on the crossmember.

23. The disk brake as claimed in claim 19, wherein the coupling wheel of the second spindle unit is coupled to the driver unit by a first end of an attachment, which surrounds the respective threaded plunger partially in a manner of a sleeve, and wherein a second end of the attachment has an actuating end for manual actuation.

24. The disk brake as claimed in claim 18, wherein the crossmember, together with the threaded plungers and the synchronizing device, is embodied as a preassembled functional unit.

25. The disk brake as claimed in claim 17, wherein the threaded plungers of the first and second spindle units are of a same design and construction.

26. The disk brake as claimed in claim 14, wherein a reaction-side brake lining is of larger design than an application-side brake lining.

27. A method for operating a wear adjustment device of a disk brake, comprising the acts of:
(S1) determination of parameters with which it is possible to infer a current wear of brake linings and of an associated brake disk, during a braking operation, and estimation of wear of the brake linings and of the brake disk by the determined parameters during the braking operation;
(S2) comparison of the estimated wear with a reference value and if the estimated wear is greater than or equal to the reference value then specification of a number of brake actuations to achieve wear adjustment of the disk brake; and
(S3) actuation of the disk brake in accordance with the specified number of the brake actuations in order to operate the wear adjustment device with a high speed of adjustment.

28. The method as claimed in claim 27, wherein an application force is chosen for slight actuation of the disk brake such that a response force for the disk brake is just reached.

29. The method as claimed in claim 27, wherein act (S3) is carried out as soon as the disk brake is released during the braking operation in which the first method act (S1) has been carried out.

* * * * *